United States Patent
Rechenberger

(10) Patent No.: US 11,979,790 B2
(45) Date of Patent: May 7, 2024

(54) 5G POSITIONING USING SIMULTANEOUS LOCALIZATION AND MAPPING (SLAM) TAGS

(71) Applicant: Deutsche Telekom AG, Bonn (DE)

(72) Inventor: Ingo Rechenberger, Stuttgart (DE)

(73) Assignee: DEUTSCHE TELEKOM AG, Bonn (DE)

( * ) Notice: Subject to any disclaimer, the term of this patent is extended or adjusted under 35 U.S.C. 154(b) by 229 days.

(21) Appl. No.: 17/553,855

(22) Filed: Dec. 17, 2021

(65) Prior Publication Data

US 2022/0201427 A1 Jun. 23, 2022

(30) Foreign Application Priority Data

Dec. 21, 2020 (EP) .................................. 20215912

(51) Int. Cl.
| | |
|---|---|
| H04W 4/029 | (2018.01) |
| H04W 4/02 | (2018.01) |
| H04W 4/021 | (2018.01) |
| H04W 4/40 | (2018.01) |
| H04W 4/80 | (2018.01) |

(52) U.S. Cl.
CPC ........... *H04W 4/023* (2013.01); *H04W 4/021* (2013.01); *H04W 4/025* (2013.01); *H04W 4/029* (2018.02); *H04W 4/40* (2018.02); *H04W 4/80* (2018.02)

(58) Field of Classification Search
CPC .............................. H04W 4/023; H04W 4/029
USPC ..................................................... 455/456.1
See application file for complete search history.

(56) References Cited

U.S. PATENT DOCUMENTS

| | | | |
|---|---|---|---|
| 11,263,894 B1* | 3/2022 | Sivakumar | H04W 4/44 |
| 11,755,886 B2* | 9/2023 | Merlin | G06N 3/084 |
| | | | 455/456.1 |
| 2016/0277911 A1* | 9/2016 | Kang | H04B 1/3822 |
| 2019/0072638 A1* | 3/2019 | Wang | H04W 4/029 |

(Continued)

FOREIGN PATENT DOCUMENTS

WO   WO 2018145154 A1   8/2018

OTHER PUBLICATIONS

Perera Charith et al: 11 "Contextual Location in the Home Using Bluetooth Beacons", IEEE Systems Journal, IEEE, US, vol. 13, No. 3, Sep. 1, 2019 (Sep. 1, 2019), pp. 2720-2723, XP011742027, ISSN: 1932-8184.

(Continued)

*Primary Examiner* — Qutbuddin Ghulamali
(74) *Attorney, Agent, or Firm* — LEYDIG, VOIT & MAYER, LTD.

(57) ABSTRACT

A system for simultaneous localization and mapping (SLAM) of an object in an area includes: at least one base station; at least one user equipment (UE) configured to communicate with the at least one base station; and at least one object to be localized. Each object of the at least one object comprises an identification (ID) tag. The at least one UE and/or the at least one base station is configured to localize a respective object via a respective ID tag. The at least one base station is configured to localize the at least one UE in the area based on 5G communication. The at least one UE is configured to localize the object based on the respective ID tag and configured to transmit a relative position of the respective object with respect to the at least one UE to the at least one base station.

13 Claims, 5 Drawing Sheets

(56) References Cited

U.S. PATENT DOCUMENTS

2020/0005650 A1* 1/2020 Park ..................... G05D 1/0088
2022/0038946 A1* 2/2022 Kim .................. H04W 28/0284

OTHER PUBLICATIONS

Gao Chao et al: "Easing the survey 1-13 burden: Quantitative assessment of low-cost signal surveys for indoor positioning", 2016 International Conference On Indoor Positioning and Indoor Navigation (IPIN), IEEE, Oct. 4, 2016 (Oct. 4, 2016), pp. 1-8, XP033005655.

* cited by examiner

5G POSITIONING USING SIMULTANEOUS LOCALIZATION AND MAPPING (SLAM) TAGS

CROSS-REFERENCE TO PRIOR APPLICATIONS

This application claims benefit to European Patent Application No. EP 20 215 912.5, filed on Dec. 21, 2020, which is hereby incorporated by reference herein.

FIELD

The present invention relates to 5G positioning, in particular to 5G positioning using simultaneous localization and mapping (SLAM) tags.

BACKGROUND

For many industries, quick and accurate positioning of devices and objects in a facility is needed to ensure a constant and efficient work flow. Furthermore, positioning data should securely remain in the facility or campus. Systems according to the state of the art utilize localization via Ultra Wide Band (UWB) and/or Bluetooth Low Energy (Bluetooth LE) technology which yields accurate localization but is costly and only used indoors. Due to the high costs, an UWB/BLE localization is in general not employed over a complete facility. For active, i.e. moving, objects, constant and real-time positioning with 8 Hz is normally used. For passive objects, e.g. tools, material, storage space etc., on demand localization and the possibility of fine navigating to the respective location is sufficient.

Currently, the positioning of devices or objects via LTE (4G) lacks accuracy and allows localization only up to a radius of around 10 m. 5G positioning alone also fails to yield sufficient accuracy for localization of objects. Furthermore, metallic surfaces may disturb and further degrade the signal. However, equipping passive objects with 5G transceivers or 5G devices is cost intensive and bears the problem of battery runtime. A mobile mesh as proposed by the Fine Range (FiRa) Consortium for peer to peer localization via UWB is critical in terms of data privacy and generates only relative but no absolute positions.

Existing approaches like omlox provide a system for fixed infrastructure real time location systems. omlox's target is the standardization the industrial UWB RTLS (the omlox core zone) and making different localization technologies interoperable (the omlox hub). FiRa on the other hand defines the fine ranging using UWB between tags equipped with UWB chips for a mobile mesh.

SUMMARY

In an exemplary embodiment, the present invention provides a system for simultaneous localization and mapping (SLAM) of an object in an area. The system includes: at least one base station; at least one user equipment (UE) configured to communicate with the at least one base station; and at least one object to be localized. Each object of the at least one object comprises an identification (ID) tag. The at least one UE and/or the at least one base station is configured to localize a respective object via a respective ID tag. The at least one base station is configured to localize the at least one UE in the area based on 5G communication. The at least one UE is configured to localize the object based on the respective ID tag and configured to transmit a relative position of the respective object with respect to the at least one UE to the at least one base station. The system further comprises a control entity configured to communicate with the at least one UE and/or the at least one base station to receive a position of the at least one UE and the relative position of the respective object. The control entity is further configured to generate a map of the position of the at least one object in the area.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
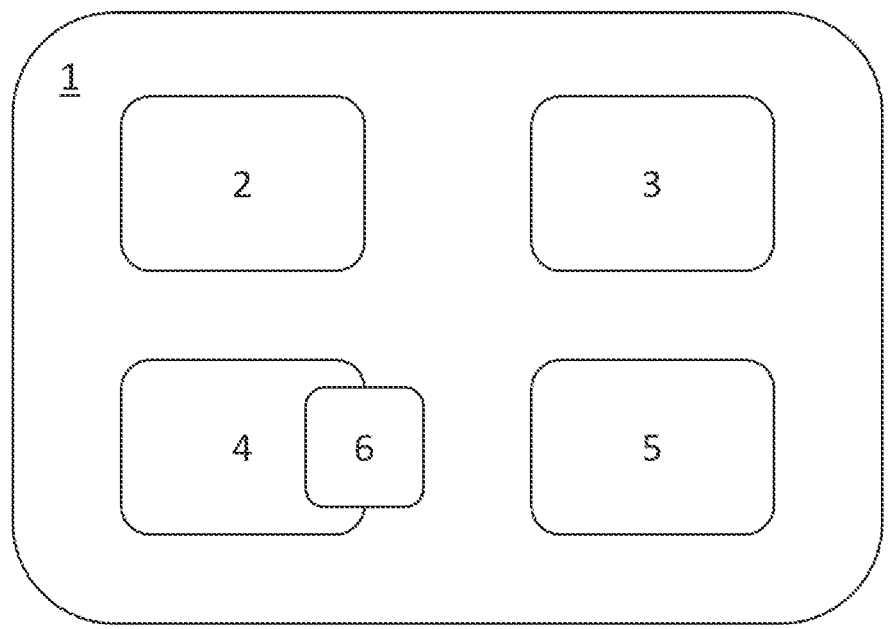
FIG. 1 shows a schematic diagram of an example according to the present disclosure.

The present disclosure relates to a system for simultaneous localization and mapping (SLAM) of an object in an area. The system comprises at least one base station and at least one user equipment (UE) configured to communicate with the at least one base station. The system further comprises at least one object to be localized, wherein the at least one object each comprises an identification tag (ID tag). The at least one UE and/or the at least one base station is configured to localize the at least one object via the respective ID tag. The at least one base station is configured to localize the at least one UE in the area based on 5G communication. The at least one UE is configured to localize the at least one object based on the respective ID tag and configured to transmit a relative position of the at least one object with respect to the at least one UE to the base station. The system further comprises a control entity configured to communicate with the at least one UE and/or the at least one base station to receive the position of the at least one UE and the relative position of the at least one object, wherein the control entity is further configured to generate a map of the position of the at least one object in the area.

Various embodiments may preferably implement the following features.

Preferably, the at least one UE and the at least one ID tag each comprise a Bluetooth Low Energy (Bluetooth LE) transceiver and the at least one UE is configured to localize the at least one object via the respective ID tag using Bluetooth LE.

Preferably, the at least one UE and the at least one ID tag each comprise an Ultra Wide Band (UWB) transceiver and the at least one UE is configured to localize the at least one object via the respective ID tag using UWB.

Preferably, the at least one object is an active object configured to actively move in the area or a passive object configured to be stationary or to be moved in the area.

Preferably, the at least one active object comprises a 5G transceiver and/or a Bluetooth Low Energy, Bluetooth LE, transceiver and/or an Ultra Wide Band, UWB, transceiver. The at least one UE is preferably configured to localize the at least one active object using 5G and/or Bluetooth LE and/or UWB. The at least one passive object each may comprise the ID tag.

Preferably, at least one fixed 5G tag is positioned in the area, wherein the at least one UE and/or the control entity is configured to generate additional localization information of a relative position of the at least one UE with respect to the at least one 5G tag via communication with the at least one 5G tag.

Preferably, the at least one UE and/or the at least one ID tag and/or the at least one 5G tag are configured to perform encrypted communication.

Preferably, the at least one UE is additionally localized by the at least one UE using Global Positioning System, GPS, wherein the at least one UE is configured to transmit the respective position to the control entity.

Preferably, the active object is at least one of an automated guided vehicle, AGV, a forklift, a truck, or an operator and/or the passive object is at least one of material, a tool, storage space or loading equipment.

Preferably, the UE is configured to guide a user of the UE to a desired object being localized.

The present disclosure further relates to a user equipment (UE) configured for use in a system as described above.

The present disclosure also encompasses a method for simultaneous localization and mapping (SLAM) of an object in an area for use in a system as described above. The method comprises localizing, based on 5G communication, at least one user equipment (UE) in the area via at least one base station and localizing, by the at least one UE, at least one object to be localized based on an identification tag (ID tag). A relative position of the localized object with regard to the UE is sent by the at least one UE to the at least one base station, and the position of the UE is sent by the base station to a control entity. The control entity generates a map of a position of the at least one object in the area using the position of the UE and the relative position of the object.

Preferably, the method further comprises localizing, by the UE, the at least one object via the respective ID tag using Bluetooth Low Energy, Bluetooth LE, and/or using Ultra Wide Band, UWB.

Preferably, the at least one object to be localized is an active object configured to actively move in the area or a passive object configured to be stationary or to be moved in the area and the method further comprises localizing the at least one passive object via the respective ID tag, and/or localizing the at least one active object using 5G and/or Bluetooth LE and/or UWB.

In the figures, the same or similar elements are denoted by the same terms and reference numbers unless indicated otherwise. In the following, the base station, UE and object may each be provided singular or in plurality. A facility may describe any confined area such as a campus, a storage building, a manufacturing facility, production hall, etc. in which an object localization as described may be performed.

FIG. 1 shows a basic configuration of an example according to the present disclosure. In particular, it shows a system 1 comprising at least one base station 2, at least one UE 3, at least one object 4 and a control entity 5. An object 4 may also be referred to as asset. Each of the at least one objects 4 comprises an identification (ID) tag 6. The ID tag 6 can form part of the object itself or may be detachably provided. The ID tag 6 may be an active device or a passive device. The at least one object 4 may be an active object or subject, i.e. an object or subject which is moving such as an automated guided vehicle (AGV), a forklift, a workman, a truck, etc., or a passive object which may either be stationary or may be passively moved in the facility such as tools, material, load carrier, storage space, etc.

The system according to the example employs a combination of Fine Ranging (FiRa), particularly a FiRa mobile mesh, and 5G positioning. Therefore, a 5G network is set up in the facility or the campus, respectively, by at least one base station 2. Preferably, the 5G network is limited to the facility itself and allows positioning of user equipment (UE) 3, i.e. mobile devices such as smartphones and other handheld devices, indoors and outdoors. The localization accuracy is normally around 2-3 m. In addition, Global Positioning System (GPS) sensors may be used to improve localization accuracy outdoors.

According to the example, the UEs 3 comprise 5G network as well as UWB capability, e.g. a FiRa UWB (IEEE 802.15.4z-2020 standard conform) chip, and Bluetooth LE functionality. The objects 4 on the other hand comprise respective means for transmitting and/or receiving 5G, UWB and/or Bluetooth LE communication. For passive objects 4, identification (ID) tags 6, in particular 5G ID tags or 5G positioning SLAM tags, may be employed. The ID tags 6 may be detachably provided on objects 4 and thus allow localization of the respective objects 4. Estimation of the distance of an object 4 or ID tag 6 can be done, e.g., via received signal strength indicator (RSSI). Since the ID tags 6 can be passive devices or low-power devices, this provides a cost effective and long-living localization of objects 4 on the campus. Each of the UEs 3 is thereby capable of localizing all objects 4. Moreover, the ID tags 6 as well as the UEs 3 may be encrypted, e.g. via a key. Thus, only authorized devices can be used for localization and for being localized. For authorization purposes, an application may be provided on the UE 3 allowing for decrypting and localizing the keys and the respective ID tags 6 and objects 4.

Active objects 4 may be UEs 3 themselves which can be localized by other UEs 3. Active objects 4 such as moving objects may also comprise a 5G transceiver and/or Bluetooth LE transceiver and/or UWB transceiver allowing the active objects 4 to be localized by UEs 3 or base stations 2. Preferably, passive objects 4 are localized using ID tags 6 while active objects 4 are localized using 5G and/or Bluetooth LE and/or UWB. An active object 4 may also report, i.e. transmit, its position to a UE 3 or a base station 2.

A control entity 5 is configured to communicate with at least one of the base station 2, the UE 3 or the object 4 to determine a position of the UE 3 and/or the object.

An exemplary localization sequence can be described as follows. The at least one UE 3 is localized via 5G, i.e. through the at least one base station 2 and the respective 5G campus positioning network. Localization is, if necessary, supported by GPS. The UE 3 regularly checks, e.g. via Bluetooth LE, whether ID tags 6, i.e. objects 4, are in the proximity of the UE 3. For objects 4 in Bluetooth LE range, an exact localization is then performed using UWB which provides an accuracy in the range of centimetres. The control entity 5 communicates with the at least one base station 2 and/or the at least one UE 3 and/or the at least one object 4. The control entity 5 is configured to determine relative and/or absolute positions of the at least one UE 3 and/or the at least one object 4. Position determination is performed by a campus SLAM algorithm which generates a map (asset map) with real-time locations of active and passive objects 4. In particular, an edge computing algorithm, i.e. a local (decentralized) computing algorithm on facility level, is employed for position determination and map generation. However, a cloud-based computation for a plurality of facilities, i.e. on company level rather than facility level, may also be used.

Searching an object 4 is performed via a UE 3 which is operated by a user. The user inputs the searched object 4 which is localized on the campus as described above. The UE 3 can then be used to navigate a user to the position of the searched object 4. The UE 3 may therefore comprise a navigation program or an application for guiding a user inside the facility. Navigation is first performed on a coarse level, where the user is guided to the area of the searched object 4, and then a refined localization is performed via precise ranging. As described above, coarse localization is performed using 5G, and GPS if necessary, while precise ranging is performed using Bluetooth LE and/or UWB.

The UE 3 can also access the asset map generated by the control entity 5 or itself generate an asset map for the user. Moreover, a mapping of objects 4 and ID tags 6 can be performed via the UE 3 or the control entity 5. Additional information in relation to the ID tags 6 and/or objects 4 may be displayed as a location-based service. Hence, the user is able to localize a searched object 4, navigate to the searched object 4 and receive information on the searched object 4.

On the other hand, localization of the UE 3 may be improved by fixed 5G ID tags which are distributed in the facility. The 5G ID tags may be similar or identical to the ID tags 6 of the objects 4. As the absolute position of the 5G ID tags is known, the position of the UE 3 can be accurately determined using the base station 2 and preferably at least two 5G ID tags. This especially improves localization performance in metallic environments having a high amount of reflections.

Figure 2:
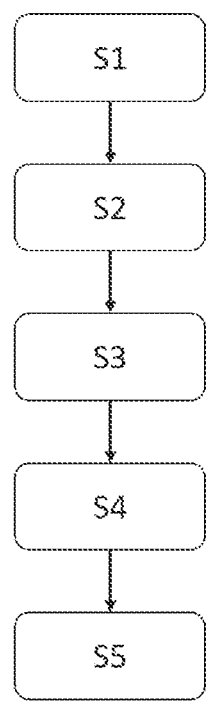
FIG. 2 shows a schematic flow diagram according to the present disclosure.

In FIG. 2, a basic flow chart according to an example of the present disclosure is shown. The shown method may be employed in a system as described above or with reference to FIG. 3 below. The area in which the method is used may be any confined area such as a facility in the above sense. The method does not have to be performed in the below order which is only for illustrative purposes. In particular, the method for simultaneous localization and mapping (SLAM) comprises localizing S1, based on 5G communication, at least one user equipment, UE, in the area via at least one base station. The at least one UE localizes S2 at least one object to be localized based on an identification, ID, tag. The at least one UE sends S3 a relative position of the localized object with regard to the UE to the at least one base station. The at least one base station sends S4 the position of the UE to a control entity. The control entity generates S5 a map of a position of the at least one object in the area using the position of the UE and the relative position of the object.

Figure 3:
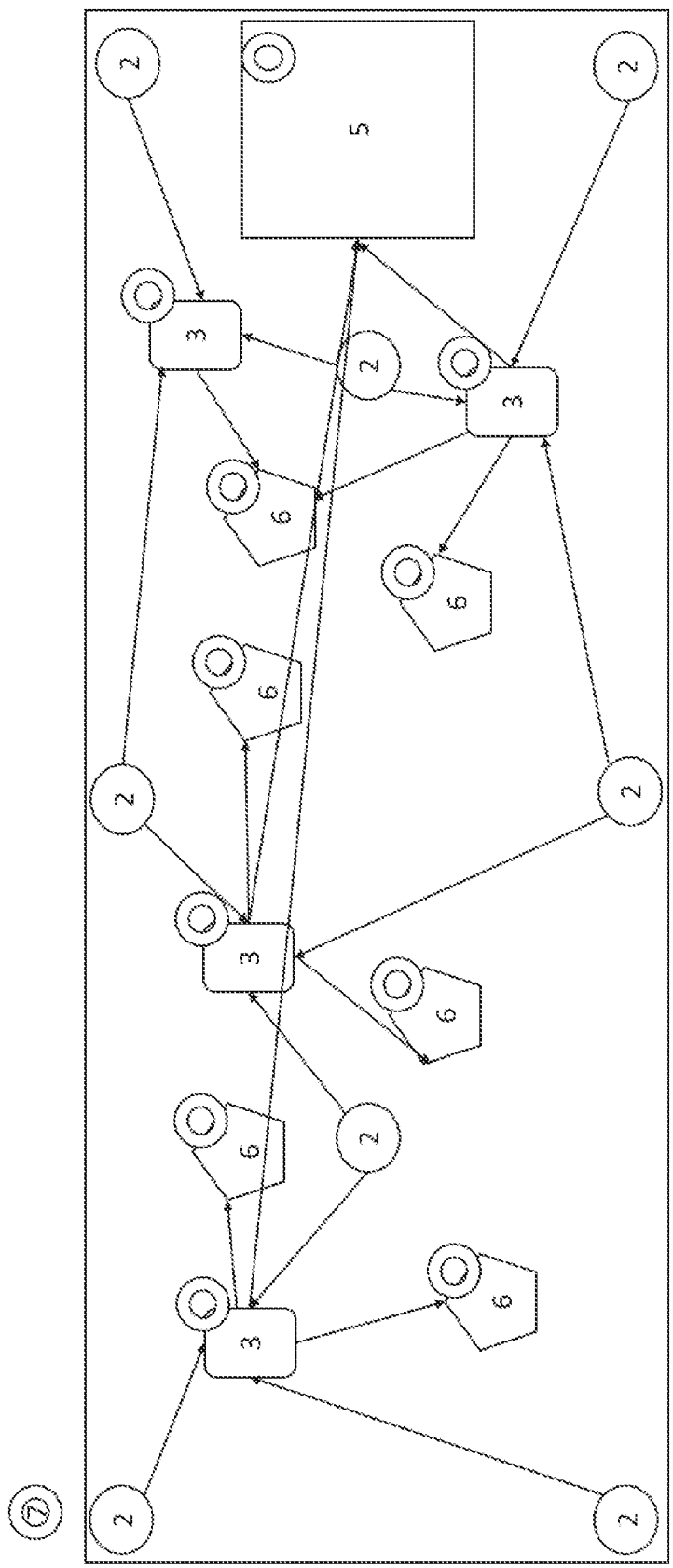
FIG. 3 shows a sample application of a system according to the present disclosure in a facility.

FIG. 3 is a depiction of a use case of the system and sequence as described above in a facility. The facility is indicated by the rectangular lines, the circles denote a key 7 as mentioned above. Keys 7 may be provided to UEs 3, ID tags 6 and objects 4. Communication paths are indicated by arrows.

A 5G network is spanned by the base stations 2, wherein absolute positions of the UEs 3 can be determined using the 5G network. Each UE 3 is capable of 5G communication and is further equipped with an UWB chip, preferably compatible with the IEEE 802.15.4z-2020 standard, as well as a Bluetooth LE chip. Moreover, a plurality of ID tags 6 are distributed in the facility indicating the position of an object 4. Each of the UEs 3 and the ID tags 6 comprises a key 7 which is encrypted particularly for the facility based on UWB and/or Bluetooth LE and allows secure communication only for authorized devices. That is, only UEs 3 having an application and a valid key 7 may localize ID tags 6. The UEs 3 can determine a relative location of an ID tag 6, i.e. a location with reference to the respective UE 3, via UWB and/or BLE and communicate the relative location to the control entity 5. Depending on the type of ID tags 6 used, i.e. whether the ID tags 6 are passive or active devices, the control entity 5 can also directly communicate with the ID tags 6. Furthermore, the control entity can also directly communicate with the base station 2. The control entity 5 can therefore compute the absolute positions of the UEs 3 and, using the relative position information of the ID tags 6 gathered by the UEs 3, the absolute positions of the ID tags 6 and the respective objects 4. The control entity 5 is thus also capable of generating a map of the positions of each of the UEs 3 and the ID tags 6.

A user can thus, using a UE 3, search for an object 4 and retrieve the position from the control entity 5. Subsequently, the user can be guided to the respective position by the UE 3. Alternatively, the user may go through the facility and check which objects 4 are in the proximity of the user via the UE 3 using 5G and/or UWB and/or Bluetooth LE and/or the map generated by the control entity 5.

Figure 4:
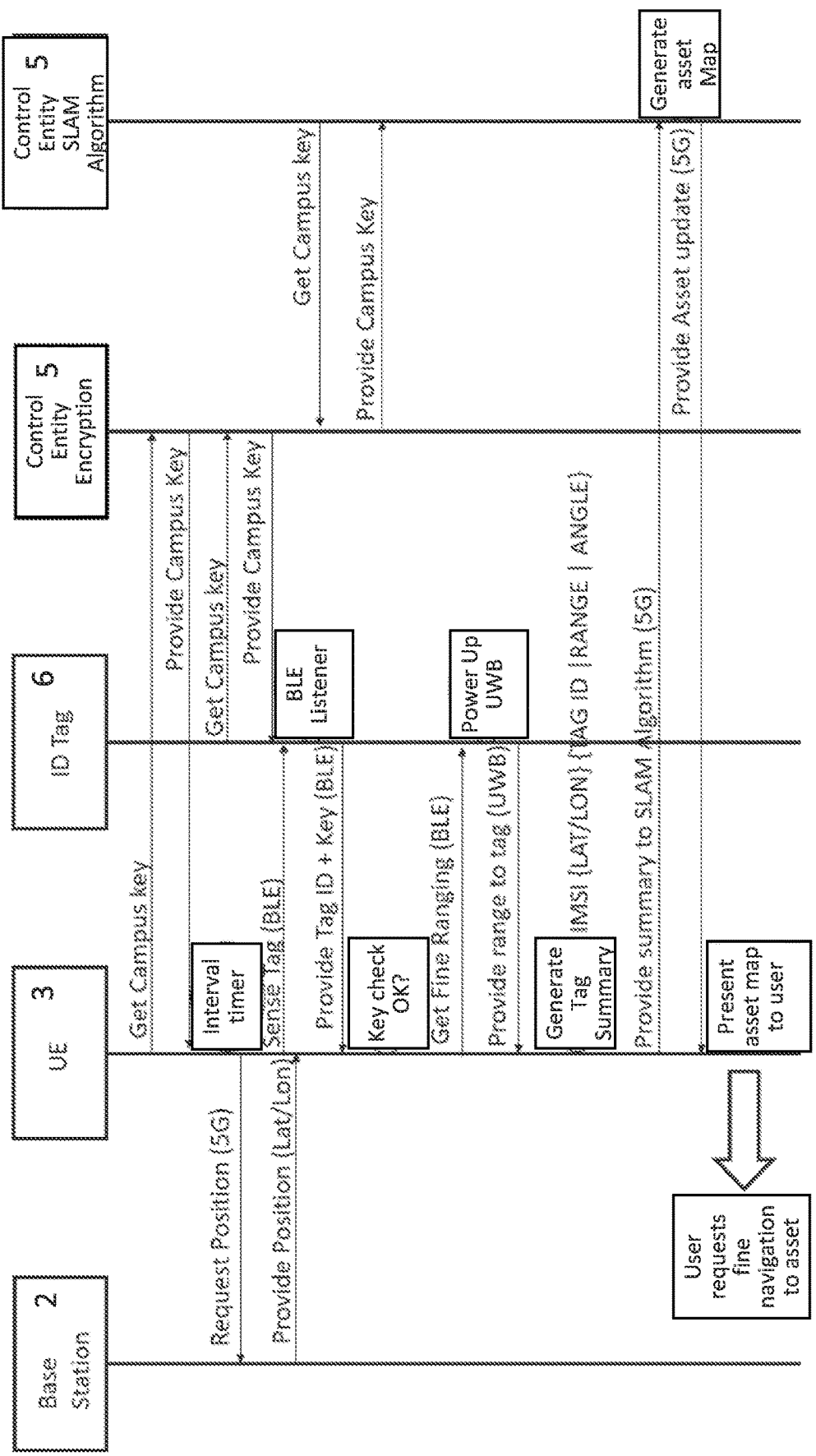
FIG. 4 shows the general working principle of ID Tags according to an example of the present disclosure.
Figure 5:
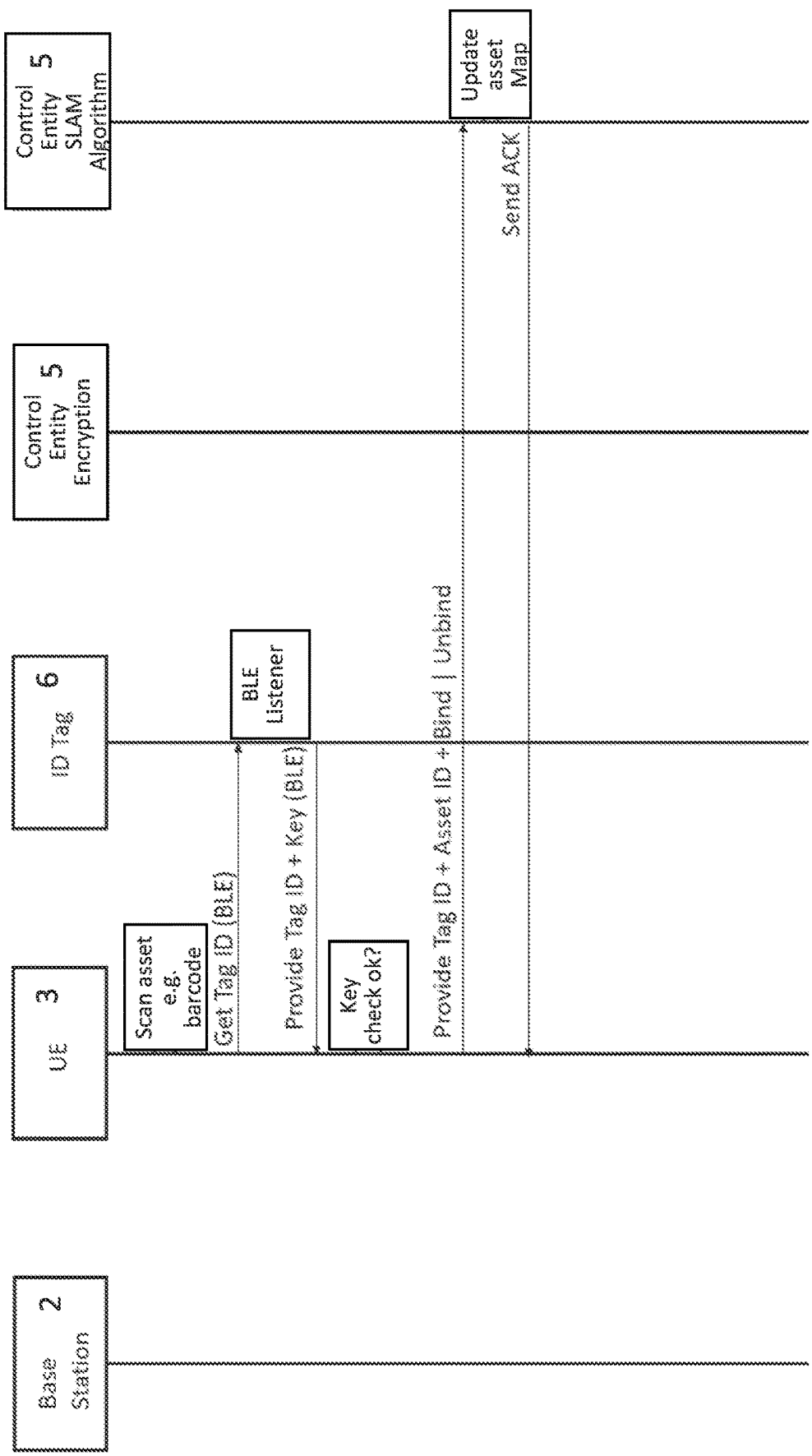
FIG. 5 shows the binding of an ID tag to an object according to an example.
Figure 6:
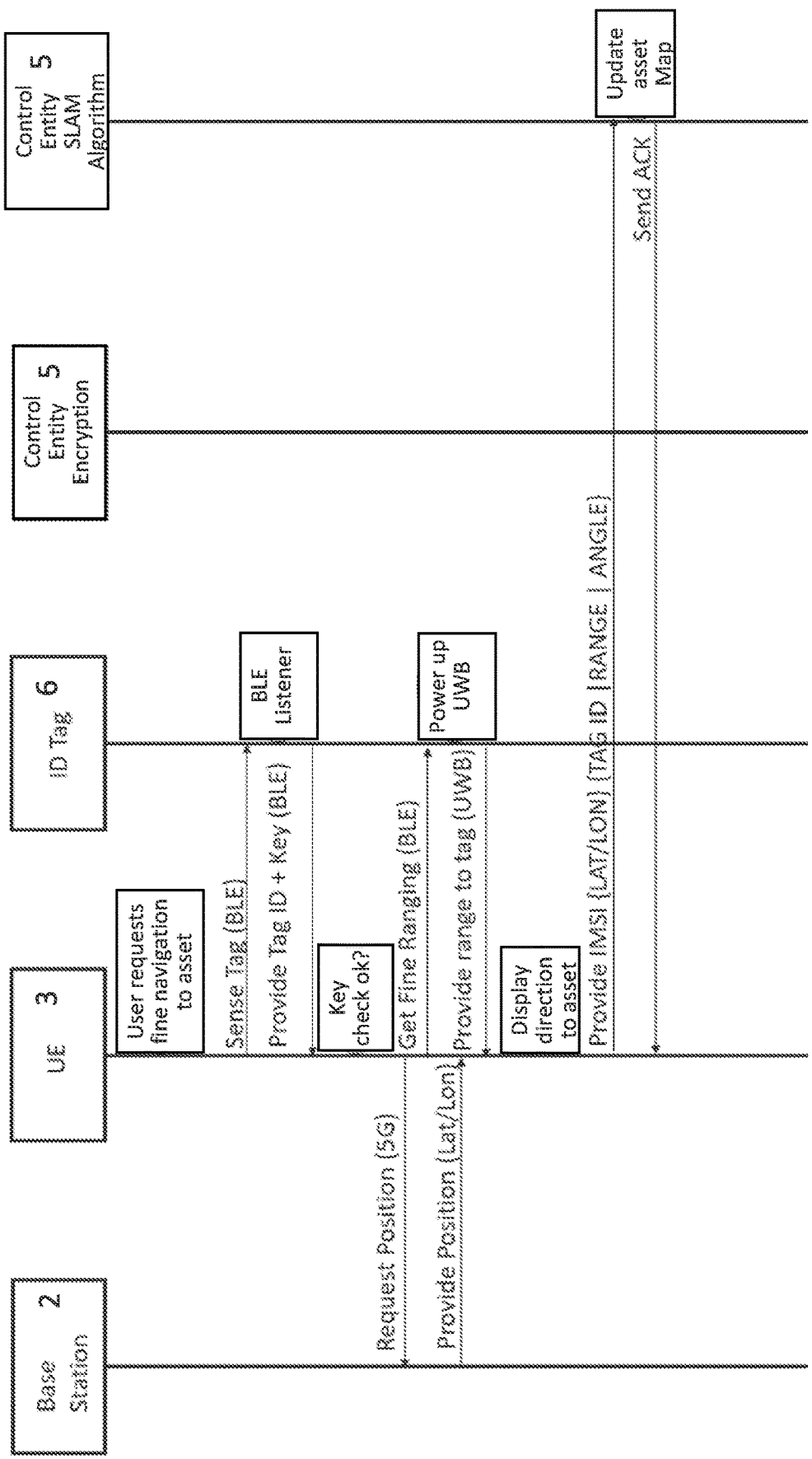
FIG. 6 shows the fine navigation to an object according to an example.

The examples according to FIGS. 4 to 6 are compatible with all examples described above. The terms object 4 and asset may be used interchangeably in the following. In the present examples, the control entity 5 is divided in a control entity encryption and a control entity SLAM algorithm. However, this is for illustrative purposes and they may also be provided in a single control entity 5 or a plurality of single interconnected entities. Arrows illustrate communication between the entities and, if applicable, the direction of communication. The time flow of the described processes goes from top to bottom.

FIG. 4 shows the general working principle of ID tags 6 according to an example of the present disclosure. A UE 3 requests a campus key 7 from the control entity encryption and receives the respective key 7. Also, an ID tag 6 requests a campus key 7 from the control entity encryption and receives the respective key 7. The UE 3 requests its position from the base station 2 and receives a position, e.g. latitude and longitude, from the base station 2. This may be performed in fixed or variable intervals. Furthermore, the control entity SLAM algorithm requests and receives the campus key 7 from the control entity encryption. The UE 3 is further configured to sense or search for ID tags 6 via Bluetooth LE. In this example, the Bluetooth LE device is referred to as BLE listener. The respective ID tags 6 provide an identification (ID) and the key 7. After checking and validating the key 7 at the UE 3, the UE 3 can proceed to requesting fine ranging using UWB. Therefore, UWB at the ID tag 6 is enabled which provides an accurate positioning range. The UE 3 then generates an ID tag 6 summary comprising, e.g., the International Mobile Subscriber Identity (IMSI) with latitude, longitude, ID of the ID tag 6, range and angle information, i.e. the location and specific information of the object 4. Other information or parameters may also be used. The summary is then provided to the control entity SLAM algorithm where a map of positions of the objects 4 or assets is generated. The updated map is transmitted back to the UE 3 where it can be presented to the user. Upon request, the UE 3 may then precisely navigate the user to the respective object 4 or asset. As mentioned above, the UE 3 may comprise an application for navigating the user to an object 4 or asset to be searched.

FIG. 5 shows the binding of an ID tag to an object according to an example of the present disclosure. For this purpose, the UE 3 scans an object 4 or asset, e.g. via a barcode or QR code or means of visual detection. The UE 3 requests and receives an ID of the ID tag 6 and a key 7 via Bluetooth LE. After verifying the key 7, the ID of the ID tag 6, an identification of the object 4 or asset as well as an information whether the parameters are bound or unbound to the object 4 are transmitted from the UE 3 to the control entity SLAM algorithm. In the control entity SLAM algorithm, the asset map, i.e. the map of locations of the objects 4, is updated. An acknowledgment (ACK) of the process is sent to the UE 3.

FIG. 6 shows the fine navigation to an object according to an example. First, the UE 3 requests fine navigation to an object 4 or asset. The UE 3 senses an ID tag 6 in its proximity via a Bluetooth LE listener and receives the ID of the ID tag 6 and a key 7 via Bluetooth LE. After validating the key 7, the UE 3 requests and receives the position from the base station 2. Localization of the UE 3 is performed via 5G, the position data may comprise latitude and longitude information. Furthermore, the UE 3 requests fine ranging via Bluetooth LE from the ID tag 6, which subsequently powers up UWB functionality. This allows the UE 3 to receive the range and localize the ID tag 6. As explained above, the UE 3 may guide the user and display a direction to the object 4 or asset to be searched. An IMSI with latitude, longitude, ID of the ID tag 6, range and angle information, i.e. the location and specific information of the object 4, is transmitted from the UE 3 to the control entity SLAM algorithm. There, the asset map, i.e. the map of the locations of the objects 4 or assets, is updated according to the new data received from the UE 3. Thereafter, an acknowledgment is sent from the control entity SLAM algorithm to the UE 3.

The present disclosure also encompasses a user equipment configured for use in a system as described above. Furthermore, the present disclosure encompasses a method for simultaneous localization and mapping (SLAM) of an object in an area. The method may be used in a system as described above.

According to the present disclosure, shortcomings of existing systems may be resolved. In particular, the system, method and user equipment presented above provide an improved approach to localization of objects in a defined area using 5G technology. By further combining 5G technology with UWB and Bluetooth LE and potentially GPS, a localization accuracy in the facility can be improved while providing a cost effective solution. The system may also be retrofittable installed to any facility. SLAM Tags as used in the present disclosure address three highly important requirements of industrial asset tracking. The approach is much more cost effective than existing fixed infrastructure solutions, protects data ownership by strong End2End encryption and only generates position updates when needed from a business perspective. SLAM Tags can be considered as a best of breed approach using the base technologies 5G Communication and Positioning, Bluetooth LE system communication and UWB for the fine ranging. The approach provides the base for easy user self services to bind/unbind an object or asset to a SLAM tag and provide the fine direction when the user is in the general area of the object.

Other aspects, features, and advantages will be apparent from the summary above, as well as from the description that follows, including the figures and the claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 System
2 Base Station
3 UE
4 Object/Asset
5 Control Entity
6 ID Tag
7 (Campus) Key

The invention claimed is:

1. A system for simultaneous localization and mapping (SLAM) of an object in an area, the system comprising:
   at least one base station;
   at least one user equipment (UE) configured to communicate with the at least one base station; and
   at least one object to be localized, wherein each object of the at least one object comprises an identification (ID) tag;
   wherein the at least one base station is configured to localize the at least one UE in the area based on 5G communication;
   wherein the at least one UE is configured to localize a respective object based on a respective ID tag and configured to transmit a relative position of the respective object with respect to the at least one UE to the at least one base station; and
   wherein the system further comprises a control entity configured to communicate with the at least one UE and/or the at least one base station to receive a position of the at least one UE and the relative position of the respective object, wherein the control entity is further configured to generate a map of the position of the at least one object in the area.

2. The system according to claim 1, wherein the at least one UE and the at least one ID tag each comprise a Bluetooth Low Energy (Bluetooth LE) transceiver, and wherein the at least one UE is configured to localize the at least one object via the respective ID tag using Bluetooth LE; and/or
wherein the at least one UE and the at least one ID tag each comprise an Ultra Wide Band (UWB) transceiver, and wherein the at least one UE is configured to localize the at least one object via the respective ID tag using UWB.

3. The system according to claim 2, wherein the at least one object comprises an active object configured to actively move in the area or a passive object configured to be stationary or to be moved in the area.

4. The system according to claim 3, wherein the active object comprises a 5G transceiver and/or a Bluetooth LE transceiver and/or an UWB transceiver;
wherein the at least one UE is configured to localize the active object using 5G and/or Bluetooth LE and/or UWB; and
wherein the passive object comprises an ID tag.

5. The system according to claim 3, wherein the active object is at least one of an automated guided vehicle (AGV), a forklift, a truck, or an operator; and/or
wherein the passive object is at least one of material, a tool, storage space or loading equipment.

6. The system according to claim 1, wherein at least one fixed 5G tag is positioned in the area, wherein the at least one UE and/or the control entity is configured to generate additional localization information of a relative position of the at least one UE with respect to the at least one fixed 5G tag via communication with the at least one fixed 5G tag.

7. The system according to claim 6, wherein the at least one UE and/or the at least one ID tag and/or the at least one fixed 5G tag are configured to perform encrypted communication.

8. The system according to claim 1, wherein the at least one UE is additionally localized by the at least one UE using Global Positioning System (GPS), and wherein the at least one UE is configured to transmit its position to the control entity.

9. The system according to claim 1, wherein the at least one UE is configured to guide a user of the at least one UE to a desired object being localized.

10. A method for simultaneous localization and mapping (SLAM) of an object in an area, the method comprising:
localizing, by at least one base station, at least one user equipment (UE) in the area based on 5G communication;
localizing, by the at least one UE, at least one object to be localized based on an identification (ID) tag;
sending, by the at least one UE, a relative position of the at least one object with regard to the at least one UE to the at least one base station;
sending, by the at least one base station, the position of the at least one UE to a control entity; and
generating, by the control entity, a map of a position of the at least one object in the area using the position of the at least one UE and the relative position of the at least one object.

11. The method according to claim 10, further comprising:
localizing, by the at least one UE, the at least one object via a respective ID tag using Bluetooth Low Energy (Bluetooth LE) and/or using Ultra Wide Band (UWB).

12. The method according to claim 10, wherein the at least one object to be localized comprises an active object configured to actively move in the area and/or a passive object configured to be stationary or to be moved in the area; and
wherein the method further comprises localizing the passive object via the respective ID tag and/or localizing the at least one active object using 5G and/or Bluetooth Low Energy (Bluetooth LE) and/or using Ultra Wide Band (UWB).

13. One or more non-transitory readable mediums having processor-executable instructions stored thereon for simultaneous localization and mapping (SLAM) of an object in an area, wherein the processor-executable instructions, when executed, facilitate:
localizing, by at least one base station, at least one user equipment (UE) in the area based on 5G communication;
localizing, by the at least one UE, at least one object to be localized based on an identification (ID) tag;
sending, by the at least one UE, a relative position of the at least one object with regard to the at least one UE to the at least one base station;
sending, by the at least one base station, the position of the at least one UE to a control entity; and
generating, by the control entity, a map of a position of the at least one object in the area using the position of the at least one UE and the relative position of the at least one object.

* * * * *